United States Patent
Redon et al.

(10) Patent No.: US 6,344,954 B1
(45) Date of Patent: Feb. 5, 2002

(54) MAGNETO-RESISTIVE TUNNEL JUNCTION HEAD WITH SPECIFIC FLUX GUIDE STRUCTURE

(75) Inventors: Olivier Redon; Koji Shimazawa; Noriaki Kasahara; Satoru Araki, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/517,580

(22) Filed: Mar. 2, 2000

(30) Foreign Application Priority Data

Jul. 2, 1999 (JP) .......................................... 11-188472

(51) Int. Cl.[7] ................................................. G11B 5/39
(52) U.S. Cl. .................................... 360/324.2; 360/321
(58) Field of Search ................................ 360/321, 322, 360/324.2, 126

(56) References Cited

U.S. PATENT DOCUMENTS

| | | |
|---|---|---|
| 5,366,815 A | 11/1994 | Araki et al. |
| 5,510,172 A | 4/1996 | Araki et al. |
| 5,514,452 A | 5/1996 | Araki et al. |
| 5,657,190 A | 8/1997 | Araki et al. |
| 5,661,449 A | 8/1997 | Araki et al. |
| 5,729,410 A | 3/1998 | Fontana, Jr. et al. |
| 5,736,236 A | 4/1998 | Araki et al. |
| 5,783,284 A | 7/1998 | Shinjo et al. |
| 5,789,069 A | 8/1998 | Araki et al. |
| 5,798,896 A | 8/1998 | Araki et al. |
| 5,862,022 A | 1/1999 | Noguchi et al. |
| 5,874,886 A | 2/1999 | Araki et al. |
| 5,898,547 A | 4/1999 | Fontana, Jr. et al. |
| 5,898,548 A | 4/1999 | Dill et al. |
| 5,901,018 A | 5/1999 | Fontana, Jr. et al. |
| 5,923,504 A | 7/1999 | Araki et al. |
| 5,958,611 A | 9/1999 | Ohta et al. |
| 5,968,676 A | 10/1999 | Araki et al. |
| 6,004,654 A | 12/1999 | Shinjo et al. |
| 6,005,753 A * | 12/1999 | Fontana .................... 360/324.2 |

* cited by examiner

*Primary Examiner*—A. J. Heinz
(74) *Attorney, Agent, or Firm*—Oblon, Spivak, McClelland, Maier & Neustadt, P.C.

(57) ABSTRACT

The present invention relates to a magneto-resistive tunnel junction head having a tunnel multilayered film composed of a tunnel barrier layer, and a ferromagnetic free layer and a ferromagnetic pinned layer formed to sandwich the tunnel barrier layer therebetween, wherein the ferromagnetic free layer comprises, in an integral fashion, a free layer main portion substantially constituting a part of the tunnel multilayered film, a front flux guide portion extending on a front side of the free layer main portion, and a back flux guide portion extending on a back side thereof, wherein the front flux guide portion constitutes a part of an ABS (Air Bearing Surface), and wherein a width-direction length Lm of the free layer main portion is set greater than a width-direction length Lf of the front flux guide portion and a width-direction length Lb of the back flux guide portion. Thus, there can be provided a magneto-resistive tunnel junction head with improved head performance, in particular, which is excellent in corrosion resistance and can achieve a high and stable head output for adaptation to the ultrahigh density recording using an improved longitudinal bias.

18 Claims, 10 Drawing Sheets

MAGNETO-RESISTIVE TUNNEL JUNCTION HEAD WITH SPECIFIC FLUX GUIDE STRUCTURE

BACKGROUND OF THE INVENTION

1. Field of the Invention

The present invention relates to a magneto-resistive tunnel junction head for reading the magnetic field intensity from a magnetic recording medium or the like as a signal and, in particular, to a magneto-resistive tunnel junction head which has a new structure of a ferromagnetic free layer for adaptation to ultrahigh density recording.

2. Description of the Prior Art

MR sensors based on the anisotropic magneto-resistance (AMR) or spin-valve (SV) effect are widely known and extensively used as read transducers in magnetic recording. MR sensors can probe the magnetic stray field coming out from transitions recorded on a recording medium by the resistance changes of a reading portion formed of magnetic materials. AMR sensors have quite a low resistance change ratio $\Delta R/R$, typically from 1 to 3%, whereas the SV sensors have a $\Delta R/R$ ranging from 2 to 7% for the same magnetic field excursion. The SV magnetic read heads showing such high sensitivity are progressively supplanting the AMR read heads to achieve very high recording density, namely over several Giga bits per square inch (Gbits/in$^2$).

Recently, a new MR sensor has attracted attention for its application potential in ultrahigh density recording. Magneto-resistive tunnel junctions (MRTJ, or synonymously referred to as TMR) are reported to have shown a resistance change ratio $\Delta R/R$ over 12%. Although it has been expected that TMR sensors replace SV sensors in the near future as the demand for ultrahigh density is ever growing, an application to the field of the magnetic heads has just started, and one of the outstanding objects is to develop a new head structure which can maximize the TMR properties. Great efforts of developments are still needed to design a new head structure since TMR sensors operate in CPP (Current Perpendicular to the Plane) geometry, which means that TMR sensors requires the current to flow in a thickness direction of a laminate film.

In a basic SV sensor which has been developed for practical applications, two ferromagnetic layers are separated by a non-magnetic layer, as described in U.S. Pat. No. 5,159,513. An exchange layer (FeMn) is further provided so as to be adjacent to one of the ferromagnetic layers. The exchange layer and the adjacent ferromagnetic layer are exchange-coupled so that the magnetization of the ferromagnetic layer is strongly pinned (fixed) in one direction. The other ferromagnetic layer has its magnetization which is free to rotate in response to a small external magnetic field. When the magnetization's of the ferromagnetic layers are changed from a parallel to an antiparallel configuration, the sensor resistance increases and a $\Delta R/R$ in the range of 2 to 7% is observed.

In comparison between the SV sensor and the TMR sensor, the structure of the TMR is similar to the SV sensor except that the non-magnetic layer separating the two ferromagnetic layers is replaced by a tunnel barrier layer being an insulating layer and that the sense current flows perpendicular to the surfaces of the ferromagnetic layers. In the TMR sensor, the sense current flowing through the tunnel barrier layer is strongly dependent upon a spin-polarization state of the two ferromagnetic layers. When the magnetization's of the two ferromagnetic layers are antiparallel to each other, the probability of the tunnel current is lowered, so that a high junction resistance is obtained. On the contrary, when the magnetization's of the two ferromagnetic layers are parallel to each other, the probability of the tunnel current is heightened and thus a low junction resistance is obtained.

U.S. Pat. Nos. 5,729,410; 5,898,547; 5,898,548 and 5,901,018 disclose examples wherein a TMR sensor (element) is applied to a magnetic head structure. In these publications, technical improvements are mainly proposed for adaptation to the ultrahigh density recording. However, the demand for development of TMR magnetic heads with respect to the ultrahigh density recording becomes high-leveled, and proposals of more advanced TMR magnetic heads have been demanded.

The present invention has been made under these circumstances and has an object to provide a magneto-resistive tunnel junction (TMR) head with improved head performance, in particular, which is excellent in corrosion resistance and can achieve a high and stable head output for adaptation to the ultrahigh density recording using an improved longitudinal bias.

SUMMARY OF THE INVENTION

For solving the foregoing problems, according to one aspect of the present invention, there is provided a magneto-resistive tunnel junction head having a tunnel multilayered film composed of a tunnel barrier layer, and a ferromagnetic free layer and a ferromagnetic pinned layer formed to sandwich the tunnel barrier layer therebetween, wherein the ferromagnetic free layer comprises, in an integral fashion, a free layer main portion substantially constituting a part of the tunnel multilayered film, a front flux guide portion extending on a front side of the free layer main portion, and a back flux guide portion extending on a back side of the free layer main portion, wherein the front flux guide portion constitutes a part of an ABS (Air Bearing Surface), and wherein a width-direction length Lm of the free layer main portion is set greater than a width-direction length Lf of the front flux guide portion and a width-direction length Lb of the back flux guide portion.

It is preferable that the tunnel barrier layer and the ferromagnetic pinned layer are stacked at a center portion of the free layer main portion so that the tunnel multilayered film is substantially formed.

It is preferable that biasing means are formed at and connected to width-direction opposite ends of the free layer main portion so as to apply a bias magnetic field to the ferromagnetic free layer in a width direction thereof.

It is preferable that a width-direction length Lp of the ferromagnetic pinned layer is set equal to or greater than the width-direction length Lf of the front flux guide portion and smaller than the width-direction length Lm of the free layer main portion, and that a length D (D=(Lp−Lf)/2) of the ferromagnetic pinned layer projecting beyond a width-direction end of the front flux guide portion is set to $0 \leq D \leq 0.15$ μm.

It is preferable that a width-direction length Lp of the ferromagnetic pinned layer is set greater than the width-direction length Lf of the front flux guide portion and smaller than the width-direction length Lm of the free layer main portion, and that a length D (D=(Lp−Lf)/2) of the ferromagnetic-pinned layer projecting beyond a width-direction end of the front flux guide portion is set to $0 < D \leq 0.15$ μm.

It is preferable that a width-direction length Lp of the ferromagnetic pinned layer is set greater than the width-direction length Lf of the front flux guide portion and smaller than the width-direction length Lm of the free layer main portion, and that a length D (D=(Lp−Lf)/2) of the ferromagnetic pinned layer projecting beyond a width-direction end of the front flux guide portion is set to 0.05 µm≦D≦0.15 µm.

It is preferable that a length H of the front flux guide portion in a depth direction thereof (perpendicular to the ABS) is set to 0.01 µm to 0.3 µm.

It is preferable that the tunnel multilayered film is electrically contacted with a pair of electrodes which are disposed to sandwich therebetween the tunnel multilayered film in a laminate direction thereof.

It is preferable that each of the pair of electrodes has a configuration including, in an integral fashion, a front electrode portion extending in a width direction of the tunnel multilayered film and side electrode portions extending from opposite ends of the front electrode portion in a depth direction (perpendicular to the ABS) so that 4-terminal measurement of current and voltage is carried out by the four side electrode portions.

It is preferable that a pair of shield layers are disposed in a confronting fashion to sandwich therebetween the pair of electrodes, and that a rear end of the back flux guide portion of the ferromagnetic free layer is connected to at least one of the shield layers.

It is preferable that the biasing means are contacted with upper or lower portions of the width-direction opposite ends of the free layer main portion, and that each of the biasing means is located with a predetermined space (G) from corresponding one of width-direction opposite ends of the ferromagnetic pinned layer.

It is preferable that the space (G) is set to no less than 0.02 µm.

It is preferable that the space (G) is set to no less than 0.02 µm and no greater than 0.3 µm.

It is preferable that the space (G) is set to no less than 0.02 µm and less than 0.15 µm.

It is preferable that the ferromagnetic free layer has a thickness of 20 Å to 500 Å.

It is preferable that the ferromagnetic free layer is a synthetic ferrimagnet.

It is preferable that each of the biasing means is made of a highly coercive material or an antiferromagnetic material, or in the form of a laminate body having an antiferromagnetic layer and at least one ferromagnetic layer.

It is preferable that a pinning layer for pinning magnetization of the ferromagnetic pinned layer is stacked on a surface of the ferromagnetic pinned layer remote from a side thereof abutting the tunnel barrier layer.

BRIEF DESCRIPTION OF THE DRAWINGS

FIGS. 9A and 9B are sectional views showing a magneto-resistive tunnel junction head according to another preferred embodiment of the present invention, wherein FIG. 9A is a sectional view similar to FIG. 4 and FIG. 9B is a sectional view taken along line VII—VII in FIG. 9A.

DETAILED DESCRIPTION OF THE INVENTION

Hereinbelow, the present invention will be described in terms of preferred embodiments with reference to the accompanying drawings.

Figure 1:
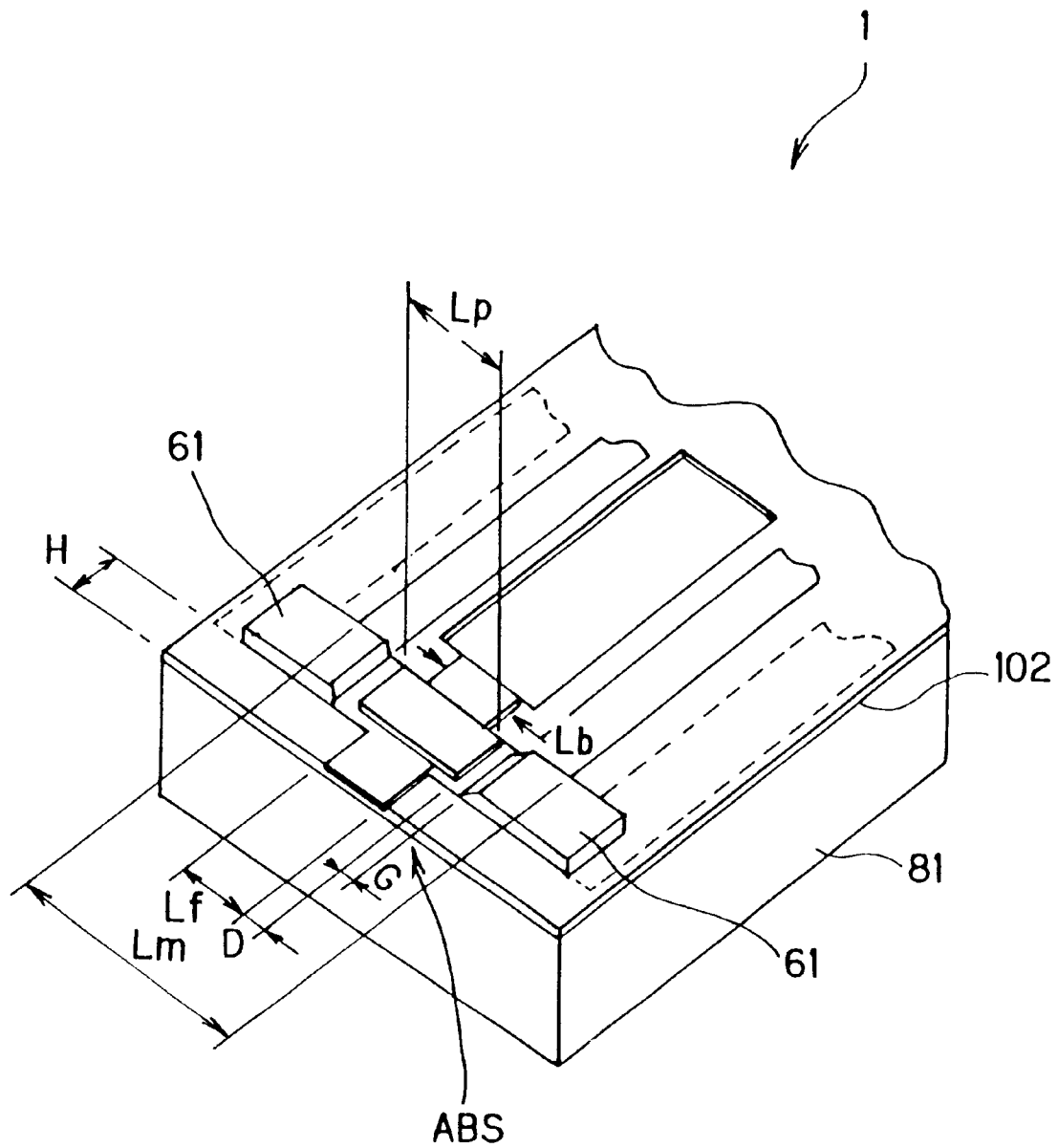
FIG. 1 is a perspective view showing a magneto-resistive tunnel junction head according to a preferred embodiment of the present invention.
Figure 2:
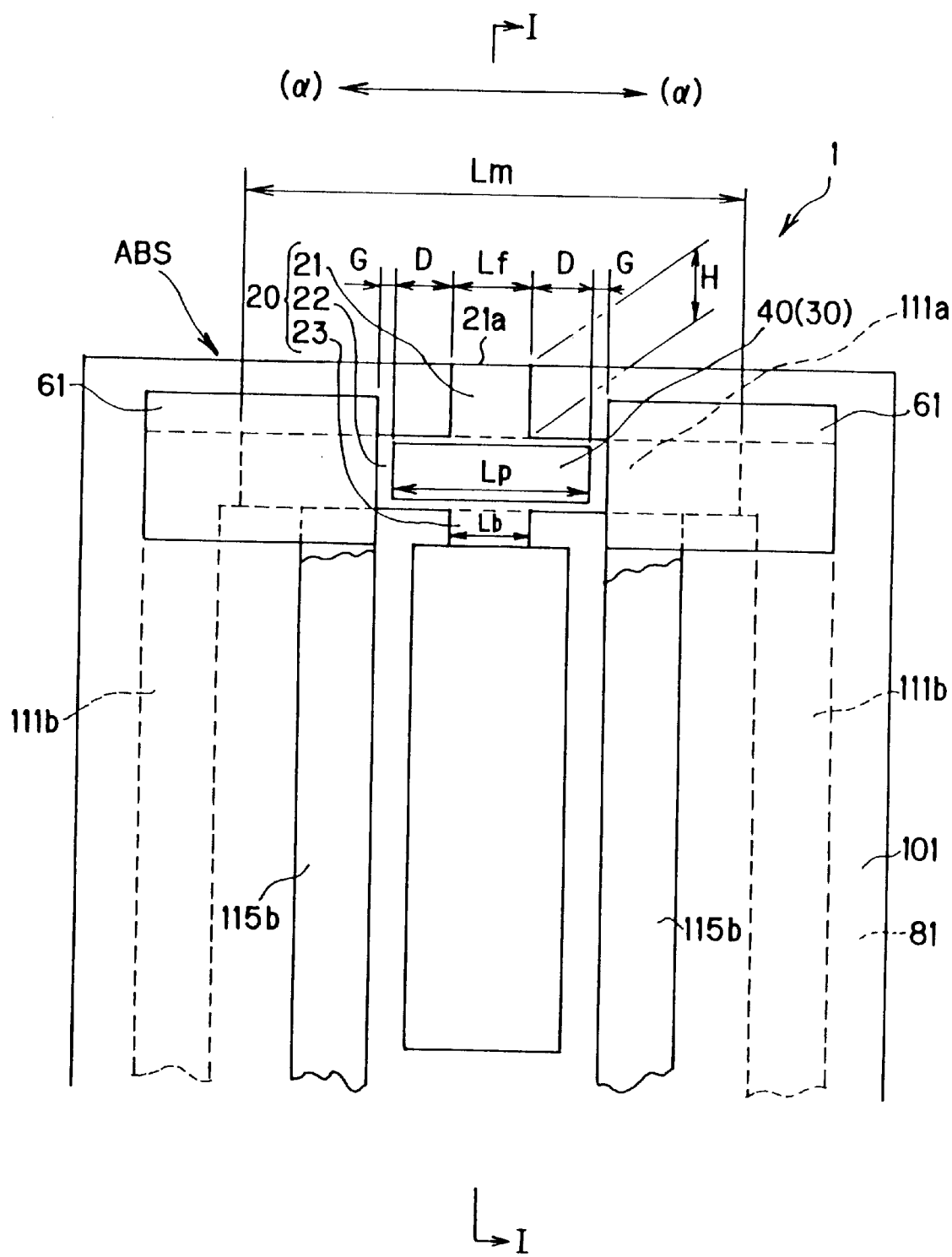
FIG. 2 is a plan view of FIG. 1.
Figure 3:
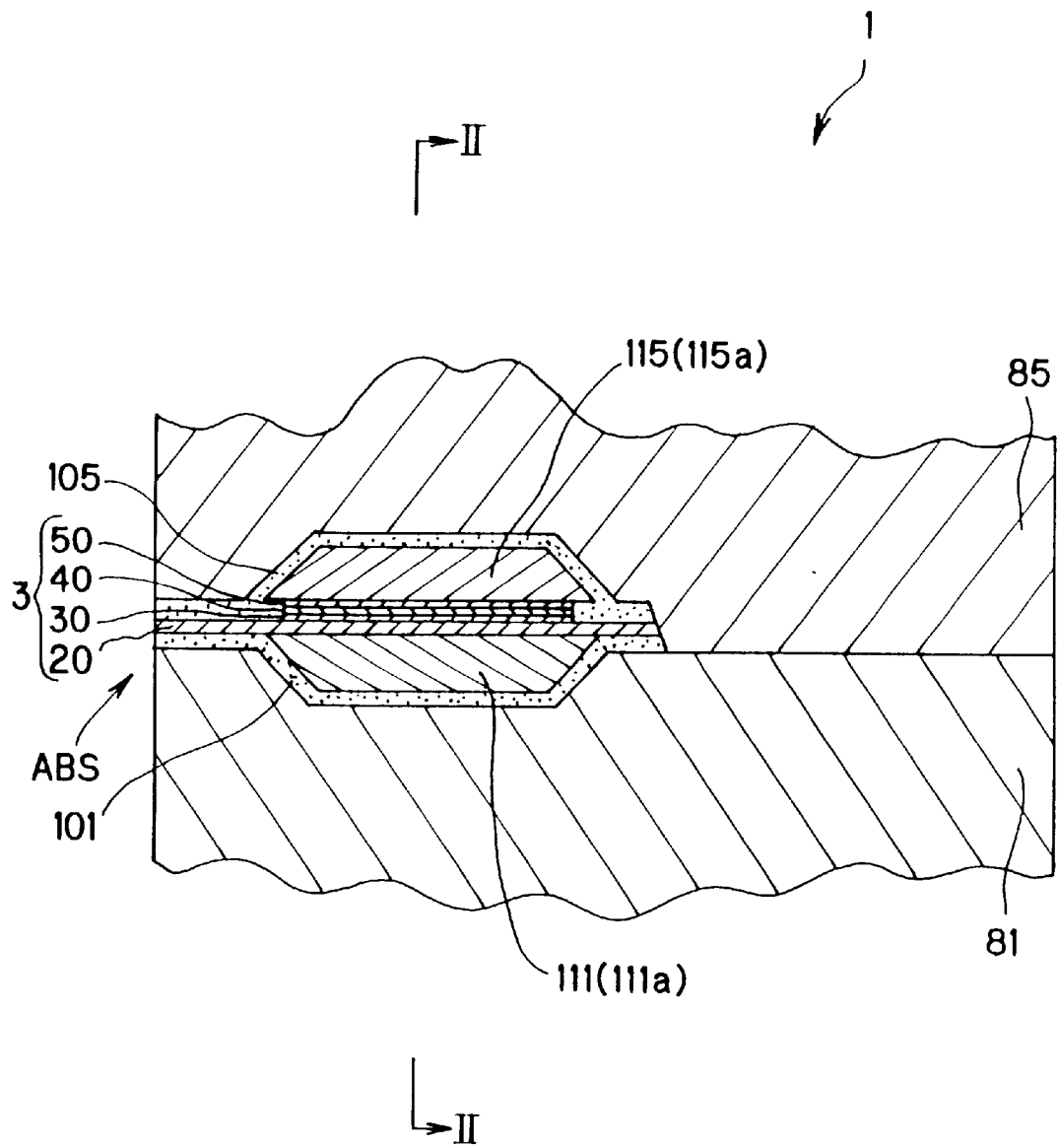
FIG. 3 is a sectional view taken along line I—I in FIG. 2.
Figure 4:
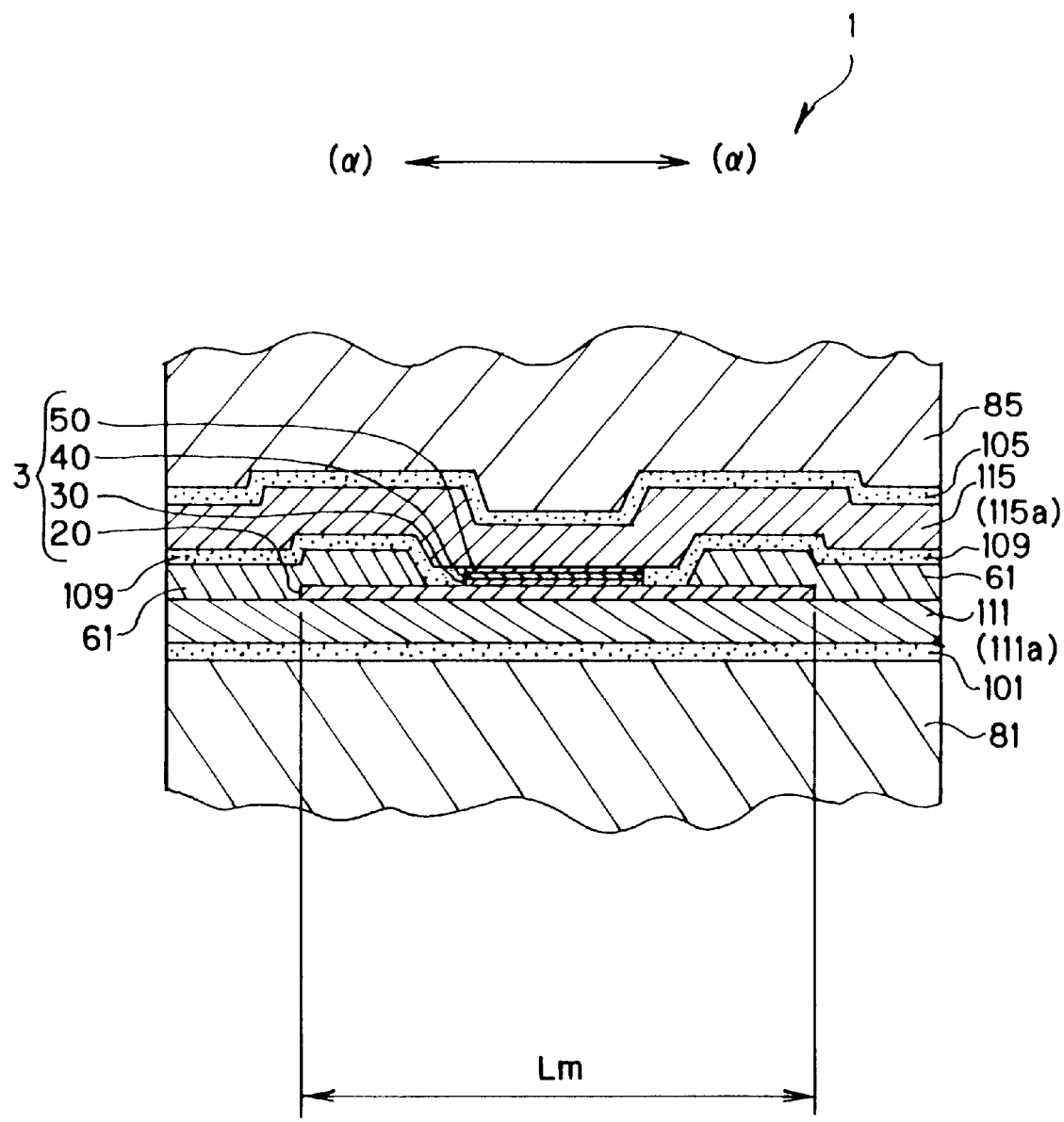
FIG. 4 is a sectional view taken along line II—II in FIG. 3.

FIG. 1 is a perspective view showing a magneto-resistive tunnel junction head (hereinafter simply referred to as "TMR head") 1 according to a preferred embodiment of the present invention, and FIG. 2 is a plan view of FIG. 1. For facilitating understanding of a characteristic portion of a head structure of the present invention, FIGS. 1 and 2 illustrate a head structure which has not been completely assembled as a magnetic head but is in the course of assembling, and show those components which are particularly necessary for explaining the present invention. FIG. 3 is a sectional view of the magnetic head (completed as a magnetic head) taken along line I—I in FIG. 2. FIG. 4 is a sectional view taken along line II—II in FIG. 3.

An ABS (Air Bearing Surface) shown in FIGS. 1–3 is a surface substantially confronting a recording medium producing an external magnetic field as magnetic information and corresponds to a surface provided with a so-called magnetic sensitive portion.

In this embodiment, the TMR head 1 is provided with a tunnel multilayered film 3 exhibiting a magneto-resistive spin tunnel effect (spin tunneling magneto-resistive effect) as clearly shown in FIGS. 3 and 4. Specifically, the tunnel multilayered film 3 has a laminate structure composed of a tunnel barrier layer 30, a ferromagnetic free layer 20 formed on one surface of the tunnel barrier layer 30, and a ferromagnetic pinned layer 40 formed on the other surface of the tunnel barrier layer 30 so that the tunnel barrier layer 30 is held between the layers 20 and 40. The ferromagnetic free layer 20 can basically change its magnetization direction freely in response to an external magnetic field as magnetic information. On the other hand, the ferromagnetic pinned layer 40 is pinned such that its magnetization direction is entirely fixed in one direction (in FIG. 4, the pinned magnetization direction is in a depth direction of the drawing sheet). Thus, as shown in FIG. 1, a pinning layer 50 for pinning the magnetization of the ferromagnetic pinned layer 40 is stacked on a surface of the ferromagnetic pinned layer 40 remote from a surface thereof abutting the tunnel barrier layer 30.

As shown in FIG. 2, the ferromagnetic free layer 20 to be used in the present invention comprises, in an integral fashion, a free layer main portion 22 substantially constituting a part of the tunnel multilayered film 3, a front flux guide portion 21 extending on a front side (ABS side) of the free layer main portion 22, and a back flux guide portion 23 extending on a back side thereof. The ferromagnetic free layer 20 has a so-called cross shape on the whole. For better understanding of the configuration of the ferromagnetic free layer 20, FIG. 10 shows only the ferromagnetic free layer 20 which is picked up from the state of FIG. 2.

Figure 10:
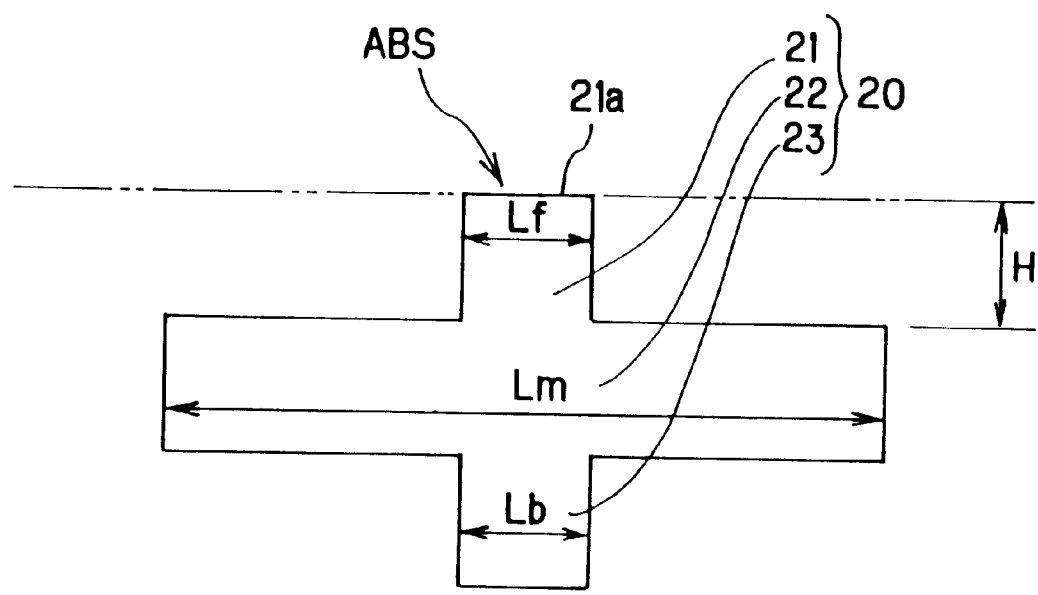
FIG. 10 is a schematic plan view showing only a ferromagnetic free layer for easily understanding the configuration thereof.

As shown in FIGS. 2 and 10, the front flux guide portion 21 has a front end portion 21a forming a part of the ABS (Air Bearing Surface). A length Lm in a width direction (representing a direction of arrows α-α) of the free layer main portion 22 is set longer than a width-direction length Lf of the front flux guide portion 21 and a width-direction length Lb of the back flux guide portion 23. At the center portion of the free layer main portion 22, the tunnel barrier layer 30, the ferromagnetic pinned layer 40 and the pinning layer 50 are stacked in turn so that the tunnel multilayered film 3 is substantially formed. Further, at width-direction opposite ends of the free layer main portion 22, biasing means 61 and 61 are formed so as to be connected thereto. By the biasing means 61 and 61, a bias magnetic field is applied to the ferromagnetic free layer 20 (particularly, the free layer main portion 22) in the width direction thereof.

A width-direction length Lp of the ferromagnetic pinned layer 40 formed over the free layer main portion 22 is set equal to or greater than the width-direction length Lf of the front flux guide portion 21 and smaller than the width-direction length Lm of the free layer main portion 22. Given that a length of each of portions of the ferromagnetic pinned layer 40 projecting beyond the opposite ends of the front flux guide portion 21 is D (D=(Lp−Lf)/2), the value of D is set to $0 \leq D \leq 0.15$ μm, preferably $0 < D \leq 0.15$ μm, and more preferably $0.05$ μm $\leq D \leq 0.15$ μm. If the value D becomes less than 0 μm, the junction resistance is increased and the coming signal magnetic flux can not be captured by 100% so that the head output tends to be lowered. On the other hand, if the value D exceeds 0.15 μm, the junction area is increased more than required relative to the coming signal magnetic flux so that the magnetic head output tends to be lowered.

In the present invention, the width-direction length Lm of the free layer main portion 22 is set to about 0.5 μm to 4 μm, the width-direction length Lf of the front flux guide portion 21 is set to about 0.1 μm to 2 μm, and the width-direction length Lb of the back flux guide portion 23 is set to about 0.1 μm to 3 μm.

Further, a length H of the front flux guide portion 21 in a depth direction (perpendicular to the ABS) is set to 0.01 μm to 0.3 μm, preferably 0.01 μm to 0.2 μm, and more preferably 0.01 μm to 0.1 μm. The value H is preferably as close to zero as possible. However, as the value H decreases, a possibility of ESD (Electro-Static Discharges) or a possibility of electric short circuit between the free layer 20 and the pinned layer 40 during a lapping process is increased. Therefore, the lower limit is preferably set to about 0.01 μm. On the other hand, if the value H exceeds 0.3 μm, the head output is lowered or the width-direction bias magnetic field becomes insufficient so that the Barkhausen noise is produced.

As shown in FIGS. 3 and 4, a pair of electrodes 111 and 115 are disposed in a laminate direction of the tunnel multilayered film 3 so as to sandwich the tunnel multilayered film 3 therebetween. The electrodes 111 and 115 are electrically contacted with the tunnel multilayered film 3. By means of the electrodes 111 and 115, a sense current is caused to flow in the tunnel multilayered film 3.

In this embodiment, each of the electrodes 111 and 115 has a ⊐-shape. Specifically, as shown in FIGS. 2–4, each of the electrodes 111 and 115 comprises, in an integral fashion, a front electrode portion 111a, 115a (The front electrode portions 111a and 115a are shown in FIGS. 3 and 4. In FIG. 2, the front electrode portion 111a is located under the tunnel multilayered film 3, while the front electrode portion 115a is located over the tunnel multilayered film 3 and thus not shown) extending in the width direction of the tunnel multilayered film 3, and side electrode portions 111b and 111b, 115b and 115b extending in a depth direction (perpendicular to the ABS) from opposite ends of the front electrode portion 111a, 115a. Accordingly, the electrodes 111 and 115 can perform 4-terminal measurement of current and voltage by means of the four side electrode portions 111b and 111b, 115b and 115b. By designing the electrodes to perform the 4-terminal measurement, the increased TMR ratio can be obtained and the noise can be reduced.

As shown in FIGS. 3 and 4, the electrodes 111 and 115 are coated with a pair of insulating layers 101 and 105, and a pair of (magnetic) shield layers 81 and 85 are further disposed in a confronting fashion to cover the insulating layers 101 and 105. It is preferable that a rear end of the back flux guide portion 23 of the ferromagnetic free layer 20 is contacted with at least the shield layer 85 (FIG. 3). With this arrangement, the magnetic sensing efficiency for the signal magnetic field is increased to achieve the increased head output.

As shown in FIG. 4, the ferromagnetic free layer 20 in the present invention is applied with a bias magnetic field in the width direction thereof (direction of arrows α-α) by the biasing means 61 and 61 disposed at and connected to the width-direction opposite ends of the ferromagnetic free layer 20. Specifically, the width direction length Lm of the free layer main portion 22 of the ferromagnetic free layer 20 is set greater than the width-direction length Lp of the ferromagnetic pinned layer 40 so that the free layer main portion 22 has extended portions at its opposite ends with respect to the ferromagnetic pinned layer 40.

The biasing means 61 and 61 are contacted in a laminate state with the extended portions at the opposite ends of the free layer main portion 22. The biasing means 61 and 61 are in exchange-coupling to the extended portions of the free layer main portion 22 so that the magnetization direction is fixed in the direction shown by arrow α. Each of the biasing means 61 and 61 is formed such that a predetermined space G is maintained from the corresponding width-direction end of the ferromagnetic pinned layer 40, as shown in FIGS. 1 and 2.

The space G is preferably determined, upon determining the head specification, in a predetermined range in order to avoid substantial lowering of TMR ratio characteristics. It is preferable that the specific value is set depending on the head specification, such as materials and dimensions of components to be used. As a preferred example, the space G is set to be no less than 0.02 μm, particularly in the range of 0.02 μm to 0.3 μm, and more preferably, in the range of 0.02 μm to less than 0.15 μm.

If the value of G is less than 0.02 μm, the TMR ratio tends to be lowered. In contrast, if the value of G increases to exceed 0.3 μm, the biasing of the front flux guide becomes too weak, thus generating undesirable noise.

The thickness of the ferromagnetic free layer 20 in the present invention is, though not particularly limited, set to be 20 Å to 500 Å, preferably 40 Å to 300 Å, and more preferably 60 Å to 200 Å. If the thickness becomes less than 20 Å, it is difficult to set the width-direction length Lm of the free layer main portion 22 to be sufficiently large in view of the film formation technique. If the thickness exceeds 500 Å, dispersion of electronic polarizability is produced due to property variance within the ferromagnetic free layer, resulting in reduction of the TMR ratio.

Each of the ferromagnetic free layer 20 and the ferromagnetic pinned layer 40 is made preferably of a high spin polarization material, such as Fe, Co, Ni, FeCo, NiFe, CoZrNb or FeCoNi for the purpose of obtaining the high TMR ratio. It may be in the form of a laminate body having two or more layers. As described before, the thickness of the ferromagnetic free layer 20 is set to be 20 Å to 500 Å, preferably 60 Å to 200 Å. An excessive thickness of the layer 20 tends to result in lowering of an output at the time of head operation and, in contrast, if it is thinner than required, magnetic properties become unstable to result in increase of noise at the time of head operation. The thickness of the ferromagnetic pinned layer 40 is set to be 10 Å to 100 Å, preferably 20 Å to 50 Å. If the thickness is more than required, the pinning of magnetization by the pinning layer 50 is weakened and, on the other hand, if it is less than required, the TMR ratio tends to reduce.

The pinning layer 50 for pinning the magnetization of the ferromagnetic pinned layer 40 is normally made of an antiferromagnetic material, although not limited thereto as long as exhibiting a pinning function. The thickness of the pinning layer 50 is normally set in the range of 60 Å to 200 Å.

Now, the ferromagnetic magneto-resistive tunnel effect (spin tunneling magneto-resistive effect) will be briefly explained. As the sense current is flowing perpendicularly to the surfaces of the TMR multilayered film 3, the conduction electrons are spin-polarized when they experienced the first ferromagnetic layer (20 or 40 depending on the current flowing direction). The probability of tunneling through the tunnel barrier layer 30 is thus spin-dependent and depends upon the relative orientation of the two ferromagnetic layers 20 and 40 sandwiching the tunnel barrier layer 30. When the ferromagnetic layers 20 and 40 are parallel in magnetization to each other (or the relative magnetization angle therebetween is small), the density of states of majoratory spins is high in both layers, resulting in a high probability of electron tunneling through 30 and a low junction resistance. In constrast with this, when the ferromagnetic layers 20 and 40 are antiparallel in magnetization to each other (or the relative angle of magnetization therebetween is large), the density of states of majoratory spins is very different in each ferromagnetic layer, resulting in a low probability of electron tunneling through 30 and a high junction resistance. By utilizing the change in resistance depending on the change in relative magnetization angle, an external magnetic field is detected, for example.

The tunnel barrier layer 30 sandwiched between the two ferromagnetic layers 20 and 40 is formed of $Al_2O_3$, NiO, GdO, MgO, $Ta_2O_5$, $MoO_2$, $TiO_2$, $WO_2$ or the like. The thickness of the tunnel barrier layer 30 is desired to be as thin as possible for reducing the resistance of the element. However, if the thickness becomes too thin to cause pin holes, a leak current is generated, which is not preferable. In general, the thickness is set to about 5 Å to 20 Å.

As one preferred example of the present invention, the ferromagnetic free layer 20 may be in the form of a synthetic ferrimagnet of a three-layered laminate body of NiFe layer (20 Å in thickness)/Ru layer (7 Å in thickness)/NiFe layer (25 Å in thickness). In this example, magnetization directions of the upper and lower NiFe layers are opposite to each other. Using the synthetic ferrimagnet, the effective thickness of the free layer can be set thinner so that the magnetic field sensitivity is improved to achieve an increased head output. Such a synthetic ferrimagnet may also be applied to the ferromagnetic pinned layer 40.

The biasing means 61 and 61 are disposed on the upper side of the opposite ends of the ferromagnetic free layer 20 in this embodiment, but they may be disposed on the lower side thereof.

Figure 5A:
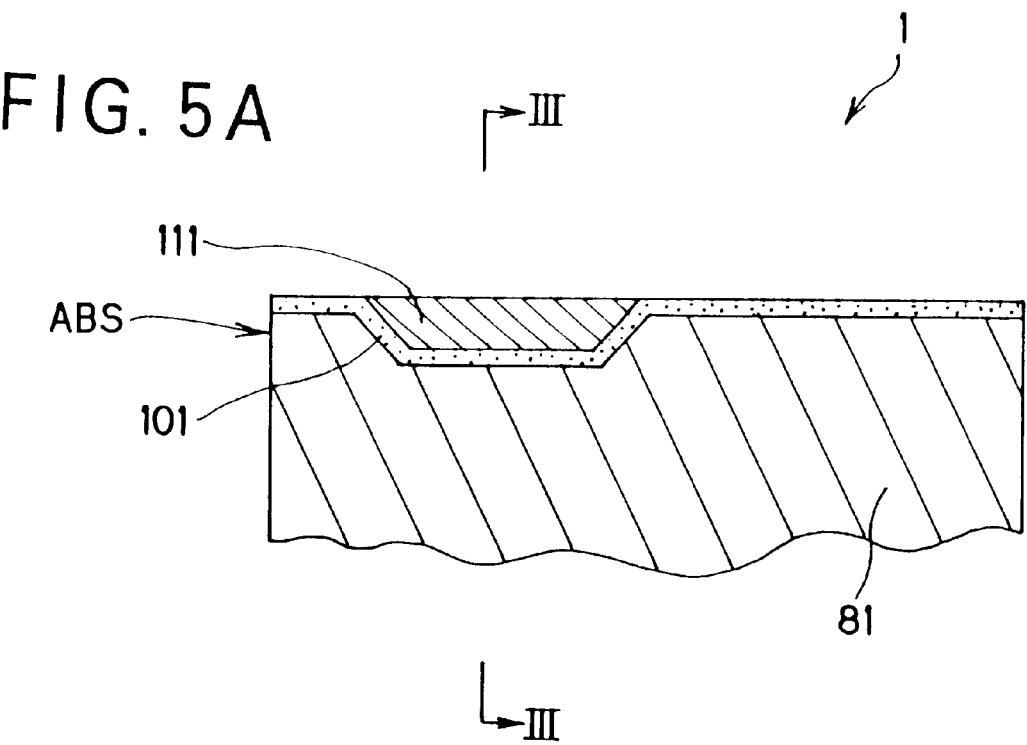
FIG. 5A is a sectional view similar to FIG. 3.
Figure 5B:
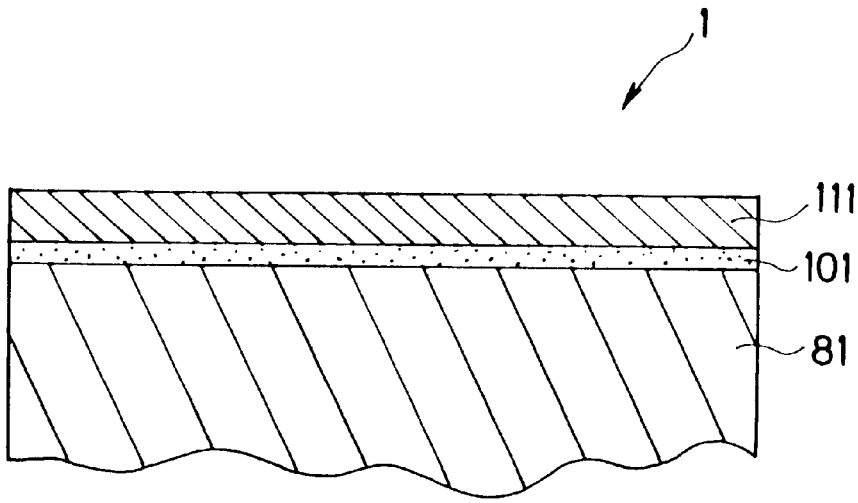
FIG. 5B is a sectional view taken along line III—III in FIG. 5A.
Figure 6A:
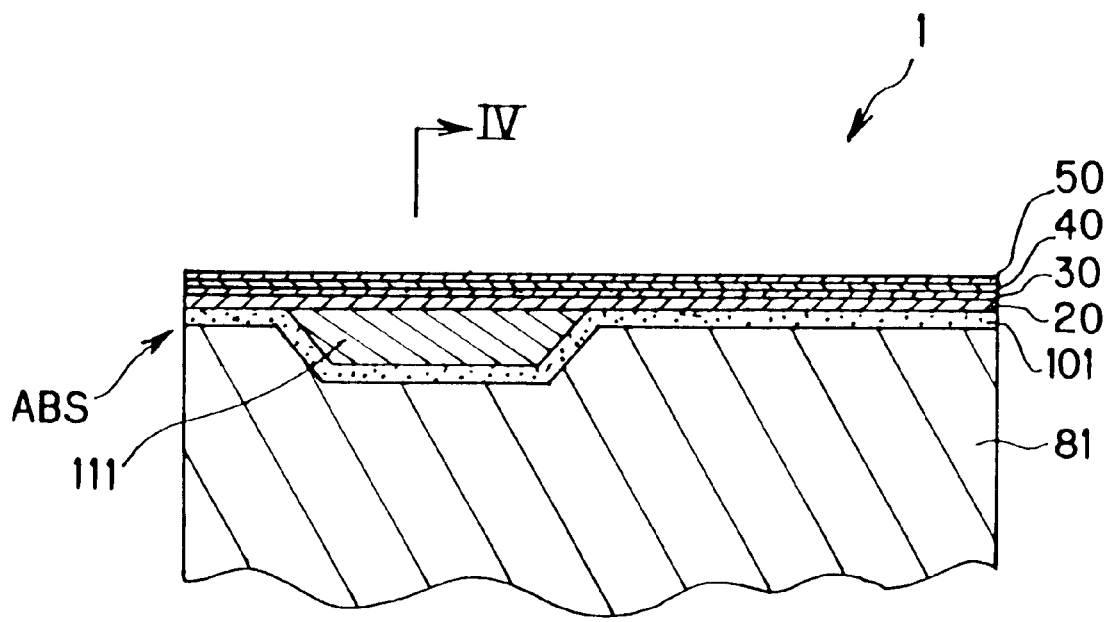
FIG. 6A is a sectional view similar to FIG. 3.
Figure 6B:
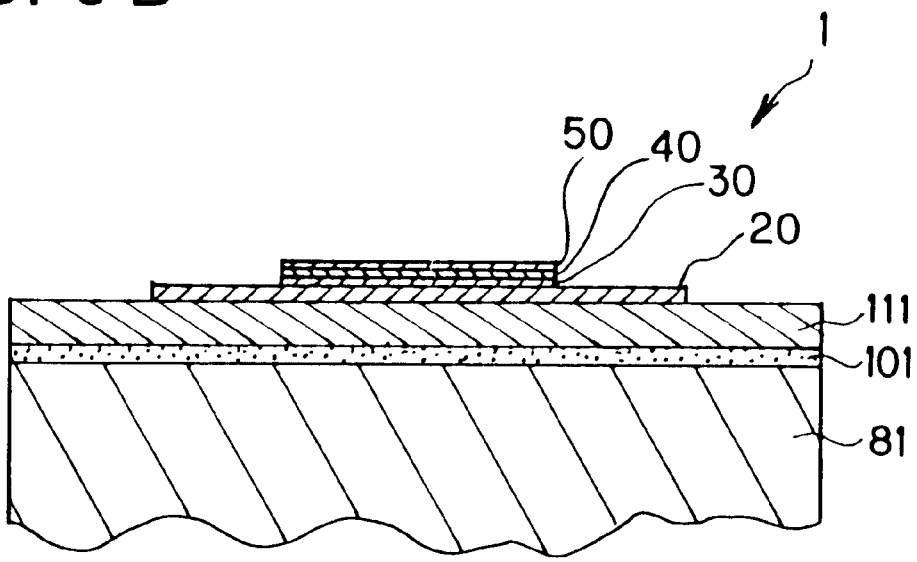
FIG. 6B is a sectional view taken along line IV—IV in FIG. 6A.
Figure 7A:
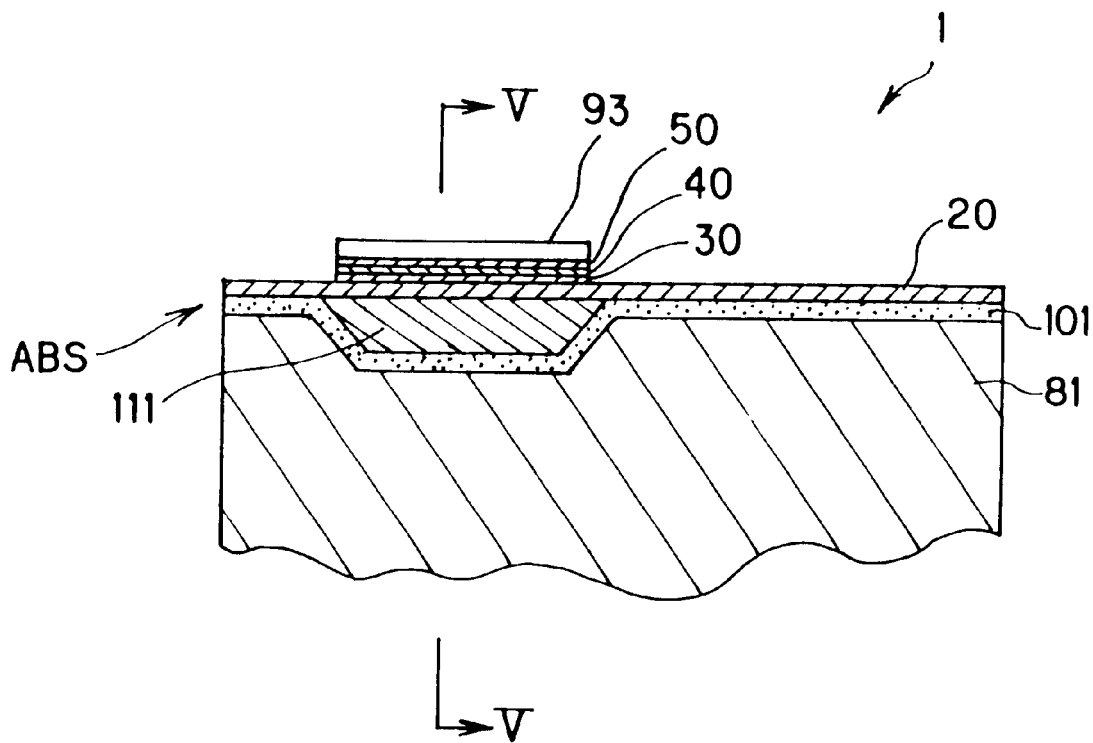
FIG. 7A is a sectional view similar to FIG. 3.
Figure 7B:
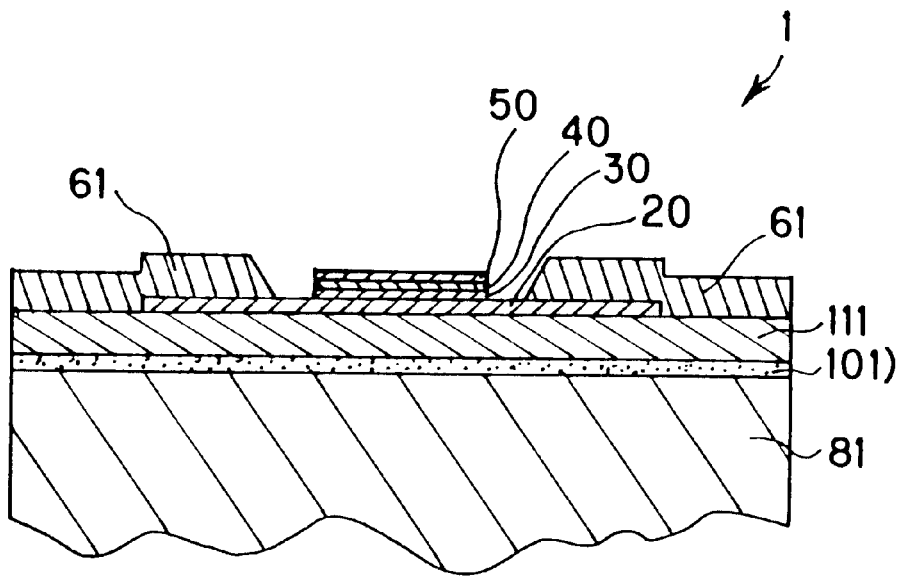
FIG. 7B is a sectional view taken along line V—V in FIG. 7A.
Figure 8A:
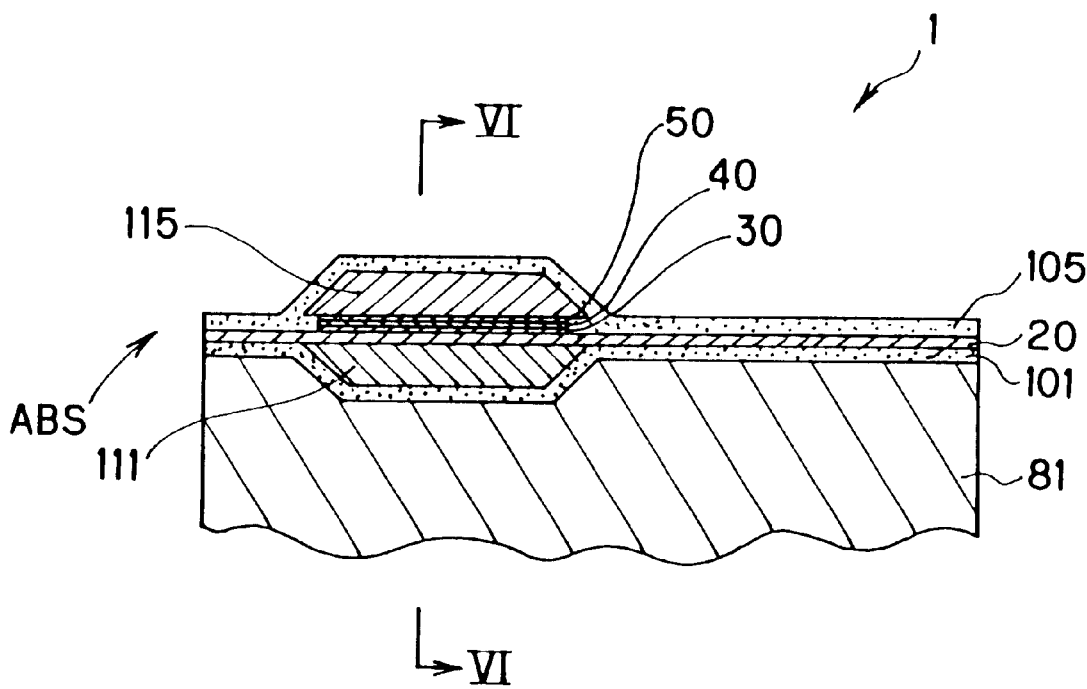
FIG. 8A is a sectional view similar to FIG. 3.
Figure 8B:
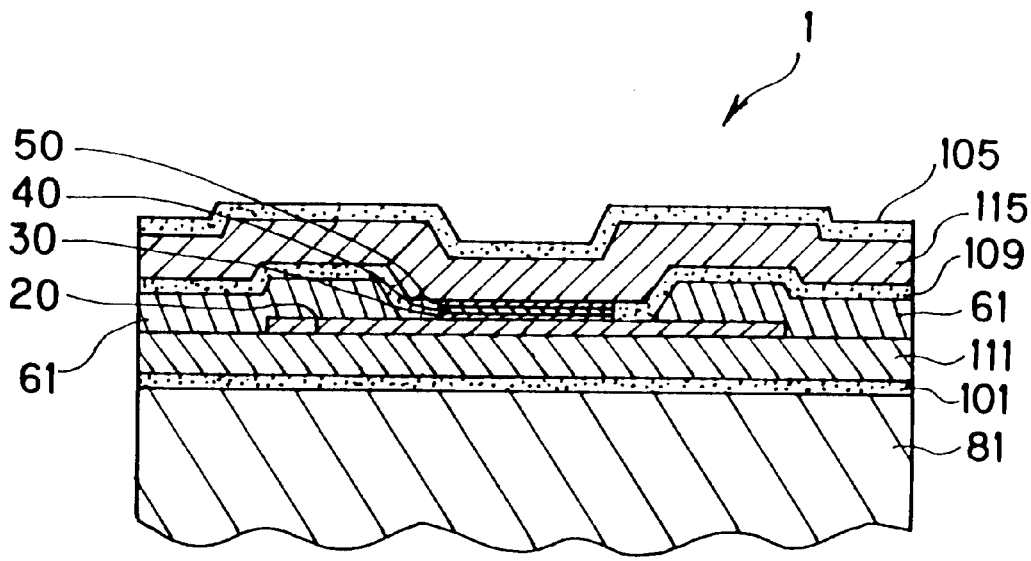
FIG. 8B is a sectional view taken along line VI—VI in FIG. 8A.

Now, a basic method of fabricating the foregoing magnetic head of the present invention will be briefly explained with reference to FIGS. 5A to 8B. FIG. 5A is a sectional view similar to FIG. 3, FIG. 5B is a sectional view taken along line III—III in FIG. 5A, FIG. 6A is a sectional view similar to FIG. 3, FIG. 6B is a sectional view taken along line IV—IV in FIG. 6A, FIG. 7A is a sectional view similar to FIG. 3, FIG. 7B is a sectional view taken along line V—V in FIG. 7A, FIG. 8A is a sectional view similar to FIG. 3, and FIG. 8B is a sectional view taken along line VI—VI in FIG. 8A. Upon fabricating the magnetic head, various known film pattern forming techniques, such as photoresist technique, ion-milling, lift-off and sputtering, are used. However, explanation of the individual techniques are omitted here.

As shown in FIGS. 5A and 5B, a concave pattern for forming a predetermined electrode is first formed on a shield layer 81, then an insulating layer 101 is formed thereon. Subsequently, an electrode element is placed in the concave pattern to form an electrode 111.

Then, as shown in FIGS. 6A and 6B, a ferromagnetic free layer 20, a tunnel barrier layer 30, a ferromagnetic pinned layer 40 and a pinning layer 50 are stacked in turn.

Then, as shown in FIGS. 7A and 7B, each of the ferromagnetic free layer 20, the tunnel barrier layer 30, the ferromagnetic pinned layer 40 and the pinning layer 50 is formed into a predetermined configuration and size, and biasing means 61 and 61 are formed at width-direction opposite ends of the ferromagnetic free layer 20.

Then, as shown in FIGS. 8A and 8B, an insulating layer 109 is formed and an electrode 115 is formed into a predetermined pattern on the insulating layer 109. Then, an insulating layer 105 is formed on the electrode 115. Further, a shield layer 85 is formed on the insulating layer 105 so that the state shown in FIGS. 3 and 4 is achieved.

After the configuration of the magnetic head is completed as described above, a pin-annealing step is further carried out. Specifically, magnetization of the ferromagnetic pinned layer 40 is pinned by the pinning layer 50 while cooled down in a proper magnetic field. In the final step, the ferromagnetic free layer 20 is subjected to a biasing operation (e.g. pinning operation) implemented by the biasing means 61.

Figure 9A:
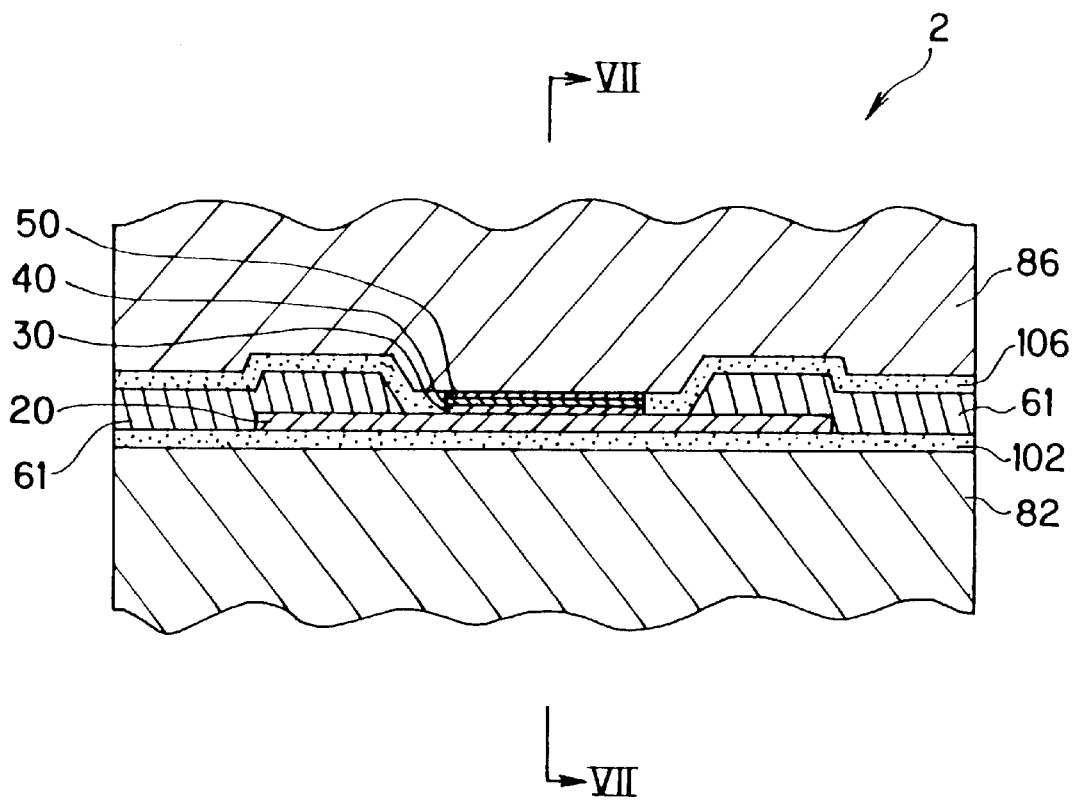
Figure 9B:
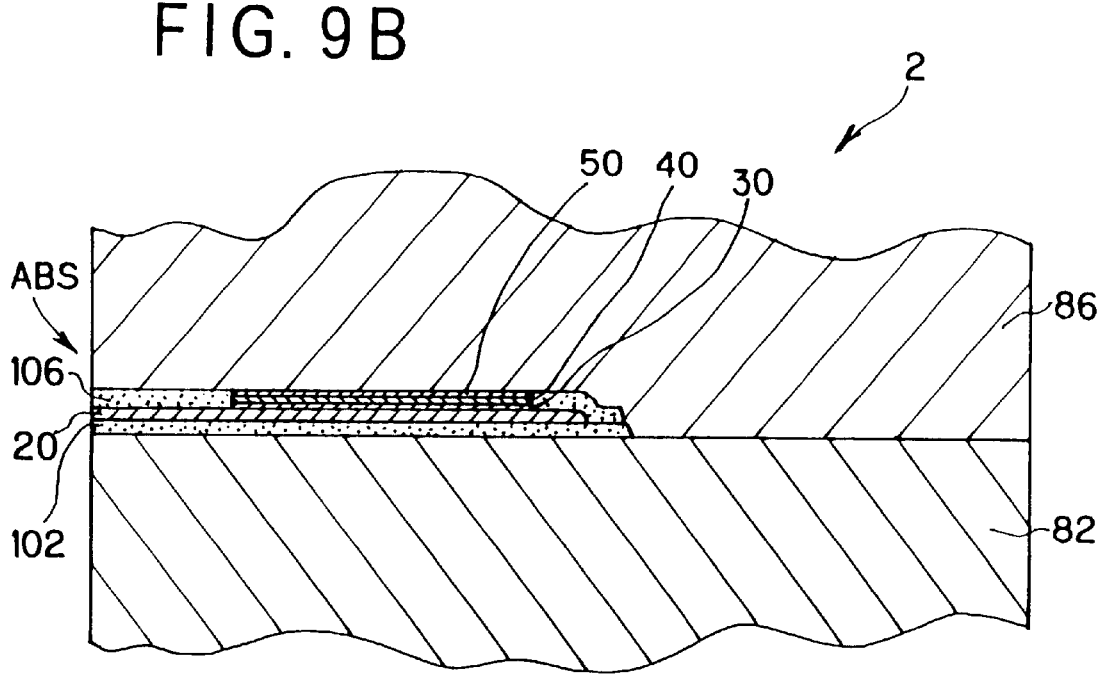

FIGS. 9A and 9B show a modification of the TMR magnetic head 1 shown in FIG. 1. FIG. 9A is a sectional view similar to FIG. 4, and FIG. 9B is a sectional view taken along line VII—VII in FIG. 9A. The TMR magnetic head 2 shown in FIGS. 9A and 9B basically differs from the TMR magnetic head 1 shown in FIG. 1 in that, on both sides of the tunnel multilayered film 3 in a laminate direction thereof, common lead and shield layers 82 and 86 are electrically contacted for serving both as electrodes for allowing a sense current to flow through the tunnel multilayered film 3 and as magnetic shield layers. By using the common lead and shield layers 82 and 86, the read gap can be largely reduced and ununiform current flows in the tunnel multilayered film 3 can be prevented.

Each of the common lead and shield layers 82 and 86 is made of NiFe (permalloy), Sendust, CoFe or CoFeNi. A sense current is supplied to the common lead and shield layers 82 and 86 so that the sense current flows through the tunnel multilayered film 3 in its laminate direction, which is electrically contacted with the common lead and shield layers 82 and 86.

The common lead and shield layers 86 may be formed so as to be directly contacted with the tunnel multilayered film 3, as illustrated in FIGS. 9A and 9B. Alternatively, the common lead and shield layer 86 may be electrically contacted with the tunnel multilayered film 3 through a non-magnetic and conductive gap layer. In case of the direct contact with the tunnel multilayered film 3 with no gap layer, the distance between the shields can be reduced to the minimum level, thus extensively contributing to the high-density recording. In contrast, in case of the indirect contact with the tunnel multilayered film 3 with provision of a gap layer, there is an advantage that the exchange coupling from the pinning layer 50 on the pinned layer 40 is larger.

The gap layer 102 is made of a material selected from tars Cu, Al, Au, Ta, Rh, Cr, In, Ir, Mg, Ru, W, Zn or an alloy of these materials. The gap layer 102 has functions of adjusting a distance between the shields, adjusting the position of the TMR multilayered film and preventing the ununiform tunnel current. The thickness of the gap layer 102 is set to about 50 Å to 700 Å. In FIG. 9A, numeral 106 denotes an insulating layer made of alumina or the like.

The invention of the foregoing magneto-resistive tunnel junction head will be explained in further detail based on the following concrete experimental examples:

EXAMPLE I

A sample of a magneto-resistive tunnel junction head having substantially the same structure as the head structure shown in FIGS. 1–4 was prepared. Specifically, a magnetic head sample having a tunnel multilayered film 3 was prepared, which was composed of a ferromagnetic free layer 20 of a two-layered laminate body of NiFe (100 Å in thickness) and Co (20 Å in thickness), a tunnel barrier layer 30 (aluminum oxide; 12 Å in thickness), a ferromagnetic pinned layer 40 (Co; 30 Å in thickness) whose magnetization is pinned in a detection magnetic field direction, and a pinning layer 50 (RuRhMn; 100 Å in thickness) for pinning the magnetization of the ferromagnetic pinned layer 40.

The ferromagnetic free layer 20 was formed into a so-called cross-shape which satisfies the requirement of the present invention. Specifically, the ferromagnetic free layer 20 was formed to include, in an integral fashion, a free layer main portion 22 substantially constituting a part of the tunnel multilayered film, a front flux guide portion 21 extending on a front side of the free layer main portion 22, and a back flux guide portion 23 extending on a back side thereof. Naturally, the front flux guide portion 21 was formed so as to constitute a part of the ABS (Air Bearing Surface).

A width-direction length Lm of the free layer main portion 22 was set to 2.5 μm, a width-direction length Lf of the front flux guide portion 21 was set to 0.5 μm, and a width-direction length Lb of the back flux guide portion 23 was set to 0.7 μm. A width-direction length Lp of the ferromagnetic pinned layer 40 was set to 0.7 μm which was greater than the width-direction length Lf of the front flux guide portion 21. A length D (D=(Lp−Lf)/2) of the ferromagnetic pinned layer 40 projecting beyond the front flux guide portion 21 was set to 0.1 μm. Further, a length H of the front flux guide portion 21 in a depth direction (perpendicular to the ABS) was set to 0.05 μm.

Electrodes 111 and 115 for supplying a current to the tunnel multilayered film 3 were each made of Ta (300 Å in thickness), and magnetic shield layers 81 and 85 were each made of permalloy. In this example, however, a rear end of the back flux guide portion 23 was not contacted with the magnetic shield layer 81, 85 (this also applies to Example II and Example III).

On width-direction opposite ends of the ferromagnetic free layer 20 (particularly, the free layer main portion 22), permanent magnets 61 and 61 of CoPt were provided in an overlapping fashion as biasing means. With the basing means 61 and 61, a bias magnetic field was applied to the ferromagnetic free layer 20 (particularly, the free layer main portion 22) in the width direction thereof (e.g. in the direction of arrow a). A junction distance of the overlapped portion was set to 0.88 μm, and a space value G was set to 0.02 μm.

Insulating layers 101, 105 and 109 were the same in configuration as those shown in FIGS. 1–4 and made of alumina. The sample prepared in the foregoing manner was set to an inventive sample I-1.

For comparison with the inventive sample I-1, a comparative sample I-1 was prepared wherein the configuration of a ferromagnetic free layer was rectangular. Specifically, Lm=Lf=Lb=0.5 μm. A width-direction length Lp of a ferromagnetic pinned layer 40 was set to 0.7 μm which was greater than the width-direction length Lf of the front flux guide portion. In this comparative example, D does not exist, and a distance from the ABS to a front end portion (side closer to the ABS) was set to 0.05 μm (equal to the foregoing H) as a value corresponding to H.

Using the TMR heads of the inventive sample I-1 and the comparative sample I-1, the head outputs were measured in the following manner:

(1) Measurement of Head Output

Using a DP (Dynamic Performance) tester, the head outputs were measured.

As a result, an output of 750 μV was obtained in the inventive sample I-1, while an output of 590 μV was obtained in the comparative sample I-1. Thus, the output of the inventive sample was about 1.27 times the output of the comparative sample I-1.

EXAMPLE II

With respect to the inventive sample I-1 prepared in the foregoing example I, samples with various lengths D (D=(Lp−Lf)/2) of the ferromagnetic pinned layer 40 projecting beyond the front flux guide portion 21 were prepared by changing the width-direction length Lp of the ferromagnetic pinned layer 40, so as to experimentally confirm an influence of the value D upon the magnetic head output.

The results are shown in Table 1. In addition to the foregoing (1) Head Output, Table 1 includes, as evaluation items, (2) Resistance Value R and (3) S/N Ratio measured in the following manner:

(2) Resistance Value R (Ω)

By subtracting a resistance of the electrode material and a junction resistance from a resistance of the whole head (HGA resistance), a resistance of the TMR junction portion (multilayered film 3) was estimated.

(3) S/N Ratio (dB)

Using a DP tester, the signal to noise ratio (S/N ratio) was derived in a normal manner. In general, this value is preferably no less than 25 dB. If this value becomes less than 20 dB, a problem is raised in head operation.

TABLE 1

| Sample No. | D ($\mu$m) | Size of Pinned Layer ($\mu m^2$) | R ($\Omega$) | Head Output ($\mu$V) | S/N (dB) |
|---|---|---|---|---|---|
| I-1 | 0.10 | 0.5 × 0.7 | 119 | 750 | 33 |
| II-1 | −0.15 | 0.5 × 0.2 | 417.5 | 490 | 16 |
| II-2 | −0.10 | 0.5 × 0.3 | 278 | 600 | 20 |
| II-3 | −0.05 | 0.5 × 0.4 | 209 | 640 | 24 |
| II-4 | 0 | 0.5 × 0.5 | 167 | 700 | 30 |
| II-5 | 0.05 | 0.5 × 0.6 | 137 | 730 | 32 |
| II-6 | 0.15 | 0.5 × 0.8 | 105 | 710 | 30 |
| II-7 | 0.20 | 0.5 × 0.9 | 62 | 600 | 19 |

From the results shown in Table 1, it is seen that the value D which can achieve an output of a predetermined level and a large S/N ratio is $0 \leq D \leq 0.15$ $\mu$m, preferably $0 < D \leq 0.15$ $\mu$m, and more preferably $0.05$ $\mu$m $\leq D \leq 0.15$ $\mu$m.

EXAMPLE III

With respect to the inventive sample I-1 prepared in the foregoing example I, samples were prepared by changing the length H of the front flux guide portion 21 in the depth direction thereof (perpendicular to the ABS), so as to experimentally confirm an influence of the value H upon the magnetic head output.

The results are shown in Table 2. In addition to the foregoing (1) Head Output, Table 2 includes, as an evaluation item, (4) Barkhausen Noise measured in the following manner:

(4) Barkhausen Noise

The Barkhousen noise was evaluated in the same manner as evaluating the so-called MR head or GMR head. The level which practically raises no problem is indicated as "○", while the level which practically raises a problem is indicated as "X".

TABLE 2

| Sample No. | H ($\mu$m) | Head Output ($\mu$V) | Barkhausen Noise |
|---|---|---|---|
| I-1 | 0.05 | 750 | ○ |
| III-1 | 0 | 520 | ○ |
| III-2 | 0.01 | 610 | ○ |
| III-3 | 0.10 | 710 | ○ |
| III-4 | 0.15 | 690 | ○ |
| III-5 | 0.20 | 660 | ○ |
| III-6 | 0.25 | 630 | ○ |
| III-7 | 0.30 | 600 | ○ |
| III-8 | 0.35 | 550 | X |
| III-9 | 0.4 | 500 | X |
| III-10 | 0.5 | 300 | X |

From the results shown in Table 2, it is seen that the length H of the front flux guide portion in the depth IBM direction thereof (perpendicular to the ABS) is preferably set in the range of 0.01 $\mu$m to 0.3 $\mu$m for effectively preventing generation of the Barkhausen noise and obtaining a large head output.

EXAMPLE IV

With respect to the samples prepared in the foregoing example III, the rear end of the back flux guide portion 23 was contacted with the magnetic shield layer 85 (FIG. 3). Other than this, samples for the example IV were prepared in the same manner as in the foregoing example III for experimentally examine an influence thereof upon the head output.

The results are shown in Table 3. In Table 3, parenthesized head output values represent data of Table 2 cited only for reference.

TABLE 3

| Sample No. | H ($\mu$m) | Head Output ($\mu$V) | Barkhausen Noise |
|---|---|---|---|
| I-1 | 0.05 | 830 (750) | ○ |
| IV-1 | 0 | 550 (520) | ○ |
| IV-2 | 0.01 | 640 (610) | ○ |
| IV-3 | 0.10 | 810 (710) | ○ |
| IV-4 | 0.15 | 780 (690) | ○ |
| IV-5 | 0.20 | 750 (660) | ○ |
| IV-6 | 0.25 | 710 (630) | ○ |
| IV-7 | 0.30 | 670 (600) | ○ |
| IV-8 | 0.35 | 580 (550) | X |
| IV-9 | 0.4 | 520 (500) | X |
| IV-10 | 0.5 | 330 (300) | X |

From the results shown in Table 3, it is seen that when the rear end of the back flux guide portion 23 is contacted with the magnetic shield layer 85, the output can be further improved.

EXAMPLE V

With respect to the inventive sample prepared in the foregoing example I, the electrodes were changed to the type in which an electrode also serves as a shield layer (FIG. 9), and the head output was derived. As a result, it was confirmed that an equivalent head output and effect were achieved.

As appreciated from the foregoing results, the effect of the present invention is clear. Specifically, the present invention relates to the magneto-resistive tunnel junction head having the tunnel multilayered film composed of the tunnel barrier layer, and the ferromagnetic free layer and the ferromagnetic pinned layer formed to sandwich the tunnel barrier layer therebetween, wherein the ferromagnetic free layer comprises, in an integral fashion, the free layer main portion substantially constituting a part of the tunnel multilayered film, the front flux guide portion extending on the front side of the free layer main portion, and the back flux guide portion extending on the back side thereof, wherein the front flux guide portion constitutes a part of the ABS (Air Bearing Surface), and wherein the width-direction length Lm of the free layer main portion is set greater than the width-direction length Lf of the front flux guide portion and the width-direction length Lb of the back flux guide portion. Thus, there can be provided a magneto-resistive tunnel junction head with improved head performance, in particular, which is excellent in corrosion resistance and can achieve a high and stable head output for adaptation to the ultrahigh density recording using an improved longitudinal bias.

What is claimed is:

1. A magneto-resistive tunnel junction head having a tunnel multilayered film composed of a tunnel barrier layer, and a ferromagnetic free layer and a ferromagnetic pinned layer formed to sandwich the tunnel barrier layer therebetween, wherein said ferromagnetic free layer comprises, in an integral fashion, a free layer main portion substantially constituting a part of said tunnel multilayered film, a front flux guide portion extending on a front side of said free layer main portion, and a back flux guide portion extending on a back side of said free layer main portion, wherein said front flux guide portion constitutes a part of an ABS (Air Bearing Surface), and wherein a width-direction length Lm of said free layer main portion is set greater than a width-direction length Lf of said front flux guide portion and a width-direction length Lb of said back flux guide portion.

2. The magneto-resistive tunnel junction head according to claim 1, wherein said tunnel barrier layer and said ferromagnetic pinned layer are stacked at a center portion of said free layer main portion so that said tunnel multilayered film is substantially formed.

3. The magneto-resistive tunnel junction head according to claim 1, wherein said ferromagnetic free layer has a thickness of 20 Å to 500 Å.

4. The magneto-resistive tunnel junction head according to claim 1, wherein a width-direction length Lp of said ferromagnetic pinned layer is set equal to or greater than the width-direction length Lf of said front flux guide portion and smaller than the width-direction length Lm of said free layer main portion, and wherein a length D (D=(Lp−Lf)/2) of said ferromagnetic pinned layer projecting beyond a width-direction end of said front flux guide portion is set to $0 \leq D \leq 0.15$ μm.

5. The magneto-resistive tunnel junction head according to claim 1, wherein a width-direction length Lp of said ferromagnetic pinned layer is set greater than the width-direction length Lf of said front flux guide portion and smaller than the width-direction length Lm of said free layer main portion, and wherein a length D (D=(Lp−Lf)/2) of said ferromagnetic pinned layer projecting beyond a width-direction end of said front flux guide portion is set to $0 < D \leq 0.15$ μm.

6. The magneto-resistive tunnel junction head according to claim 1, wherein a width-direction length Lp of said ferromagnetic pinned layer is set greater than the width-direction length Lf of said front flux guide portion and smaller than the width-direction length Lm of said free layer main portion, and wherein a length D (D=(Lp−Lf)/2) of said ferromagnetic pinned layer projecting beyond a width-direction end of said front flux guide portion is set to $0.05 \mu m \leq D \leq 0.15 \mu m$.

7. The magneto-resistive tunnel junction head according to claim 1, wherein a length H of said front flux guide portion in a depth direction thereof (perpendicular to the ABS) is set to 0.01 μm to 0.3 μm.

8. The magneto-resistive tunnel junction head according to claim 1, wherein said tunnel multilayered film is electrically contacted with a pair of electrodes which are disposed to sandwich therebetween said tunnel multilayered film in a laminate direction thereof.

9. The magneto-resistive tunnel junction head according to claim 8, wherein each of the pair of electrodes has a configuration including, in an integral fashion, a front electrode portion extending in a width direction of said tunnel multilayered film and side electrode portions extending from opposite ends of said front electrode portion in a depth direction (perpendicular to the ABS) so that 4-terminal measurement of current and voltage is carried out by the four side electrode portions.

10. The magneto-resistive tunnel junction head according to claim 8, wherein a pair of shield layers are disposed in a confronting fashion to sandwich therebetween said pair of electrodes, and wherein a rear end of the back flux guide portion of said ferromagnetic free layer is connected to at least one of said shield layers.

11. The magneto-resistive tunnel junction head according to claim 1, wherein biasing means are formed at and connected to width-direction opposite ends of said free layer main portion so as to apply a bias magnetic field to said ferromagnetic free layer in a width direction thereof.

12. The magneto-resistive tunnel junction head according to claim 11, wherein said biasing means are contacted with upper or lower portions of the width-direction opposite ends of said free layer main portion, and wherein each of said biasing means is located with a predetermined space (G) from corresponding one of width-direction opposite ends of said ferromagnetic pinned layer.

13. The magneto-resistive tunnel junction head according to claim 12, wherein said space (G) is set to no less than 0.02 μm.

14. The magneto-resistive tunnel junction head according to claim 12, wherein said space (G) is set to no less than 0.02 μm and less than 0.15 μm.

15. The magneto-resistive tunnel junction head according to claim 12, wherein said space (G) is set to no less than 0.02 μm and no greater than 0.3 μm.

16. The magneto-resistive tunnel junction head according to claim 1, wherein said ferromagnetic free layer is a synthetic ferrimagnet.

17. The magneto-resistive tunnel junction head according to claim 1, wherein each of said biasing means is made of a highly coercive material or an antiferromagnetic material, or in the form of a laminate body having an antiferromagnetic layer and at least one ferromagnetic layer.

18. The magneto-resistive tunnel junction head according to claim 1, wherein a pinning layer for pinning magnetization of said ferromagnetic pinned layer is stacked on a surface of said ferromagnetic pinned layer remote from a side thereof abutting said tunnel barrier layer.

* * * * *